United States Patent [19]
Sturt et al.

[11] 3,856,733
[45] Dec. 24, 1974

[54] POLYMERISATION PROCESS FOR GRAFTING VINYL CHLORIDE ON ETHYLENE-VINYL ACETATE COPOLYMER

[75] Inventors: Alan Charles Sturt, Guildford;
Richard Harvey Williams, Horsham, both of England

[73] Assignee: Vinyl Products Limited, Carshalton, Surrey, England

[22] Filed: Aug. 10, 1972

[21] Appl. No.: 279,354

Related U.S. Application Data

[63] Continuation-in-part of Ser. No. 113,072, Feb. 5, 1971, abandoned.

[30] Foreign Application Priority Data
Feb. 5, 1970 Great Britain.................. 5575/70

[52] U.S. Cl....................... 260/29.6 RB, 260/878 R
[51] Int. Cl....................... C08f 45/24, C08f 15/40
[58] Field of Search................. 260/29.6 RB, 878 R

[56] References Cited
UNITED STATES PATENTS
3,358,054   12/1967   Hardt et al.......................... 260/878

OTHER PUBLICATIONS
Hardt et al., "Impact-Resistant Poly-(vinyl chloride),"
Chem. Abst. 64, 19899 d, (1966).

Hardt et al., "Ethylene-Vinyl Acetate Copolymer-Monomer Graft Copolymers," Chem. Abst. 66, 55989x, (1967).

Beer, "Graft Copolymers of Vinyl Acetate and Vinyl Chloride Homopolymers or Copolymers," Chem. Abst. 67, 12065w, (1967).

Itazawa et al., "vinyl Chloride-Grafted Ethylene-Vinyl Acetate Copolymers," Chem. Abst. 75, 13033 y, (1971).

*Primary Examiner*—Melvin Goldstein
*Assistant Examiner*—E. A. Nielsen

[57] ABSTRACT

Latices capable of forming films at ambient temperatures comprising a latex of an ethylene/vinyl acetate copolymer with a polymerised ethylene content of 5 to 45% by dry weight having vinyl chloride units graft polymerised thereto, wherein the copolymer contains at least 2 parts by dry weight of ethylene/vinyl acetate copolymer for every 1 part of graft polymerised vinyl chloride units. The latices are especially suitable for use in paint, paper coating and adhesive formulations.

5 Claims, No Drawings

POLYMERISATION PROCESS FOR GRAFTING VINYL CHLORIDE ON ETHYLENE-VINYL ACETATE COPOLYMER

This is a continuation-in-part of our copending application Ser. No. 113,072 filed Feb. 5, 1971, now abandoned.

The present invention relates to film forming latices of grafted copolymers.

Film forming copolymers prepared from vinyl acetate and ethylene wherein the ethylene acts as an internal plasticiser for the vinyl acetate polymer are well known. For use in applications such as paints, paper coating and adhesives they suitably contain about 60 percent by weight or more of copolymerised vinyl acetate. However, they have the disadvantages that vinyl acetate is an expensive monomer, and that the copolymers normally have to be prepared by a relatively expensive technique employing pressures of at least 750 psig in order to obtain a satisfactory level of copolymerised ethylene. These copolymers have the further disadvantage in that, while they show excellent general performance as surface coatings, limitations become apparent particularly where the films are used in exterior applications on alkaline substrates.

A system has been proposed in British Pat. Specification No. 1,162,575 wherein part of the vinyl acetate in the copolymer is replaced by vinyl chloride in order to overcome the hydrolysis problem. This system has the further advantage that vinyl chloride is a cheaper monomer than vinyl acetate. However, the method of polymerisation is essentially similar to that for vinyl acetate/ethylene copolymers in that the vinyl chloride is added with the vinyl acetate at the same elevated pressures.

It is known that polymers having the properties of a polyvinyl chloride resin may be prepared from vinyl acetate, vinyl chloride and ethylene by preforming a vinyl acetate/ethylene copolymer and subsequently graft polymerising vinyl chloride onto it. Such polymers if formed in aqueous emulsion would not be expected to give latices that form films at ambient temperatures. These materials are prepared from vinyl acetate/ethylene copolymers that are rubbery in nature, for example, by dissolving the rubbery ethylene/vinyl acetate copolymer in vinyl chloride and carrying out the polymerisation by the techniques normally used for vinyl chloride polymerisation. Further the quantity of vinyl chloride grafted thereon is sufficiently large that the resulting polymer has the properties of a modified vinyl chloride homopolymer.

It is an object of the present invention to provide film forming copolymer latices containing vinyl acetate/ethylene copolymers upon which is grafted vinyl chloride, which have the properties of modified ethylene/vinyl acetate copolymers. It is a further object to provide a process for the production of film forming copolymer latices based on vinyl acetate, ethylene, vinyl chloride and said process being carried out at least in part at a relatively low pressure.

According to the present invention, a copolymer latex capable of forming coherent films at ambient temperatures comprises a latex of an ethylene/vinyl acetate copolymer with a polymerised ethylene content of 5 to 45% by dry weight having vinyl chloride units graft polymerised thereon wherein the copolymer contains at least 2 parts by dry weight of ethylene vinyl acetate copolymer for every 1 part by dry weight of graft polymerised vinyl chloride units.

Preferably the copolymers contain up to 4.5 parts by dry weight ethylene/vinyl acetate copolymer for every 1 part by dry weight graft, polymerised vinyl chloride units.

It is well known in the art that different countries have different criteria for the minimum film forming temperature (MFT) of latices for use in e.g. paint formulations. It is a preferred aspect of the present invention that the latices have an MFT of 9°C, a temperature which is acceptable to the paint industry in the United Kingdom. It is envisaged that latices having MFT values of up to 30°C could be useful in industrial applications. The MFT values used throughout the specification refer to the copolymer latices in uncompounded form, i.e. in the absence of coalescing solvents.

It is believed that as the polymerised ethylene content of the ethylene/vinyl acetate copolymer latex is increased, so a softer copolymer is produced which results in a latex having a lower MFT. Accordingly, the more polymerised ethylene that is in the ethylene/vinyl acetate copolymer, the greater the amount of graft polymerised vinyl chloride units can be present in the latex while still retaining the ability of the latex to form coherent films at 30°C or below.

The preferred compolymers according to the present invention contain from 10 to 33% by dry weight of polymerised vinyl chloride.

The vinyl acetate/ethylene copolymer latices suitable for use in the present invention may be prepared by any of the methods well known in the art. The preferred vinyl acetate/ethylene copolymers contain from 15 to 35% by dry weight of copolymerised ethylene.

The present invention is further a process for the preparation of a film forming copolymer latex which comprises polymerising vinyl chloride in the presence of a preformed ethylene/vinyl acetate copolymer latex having a polymerised ethylene content of 5 to 45% by dry weight under emulsion polymerisation conditions with a water soluble polymerisation initiator, the amount of vinyl chloride polymerised being such that the resultant copolymer contains up to 0.5 parts by dry weight of graft polymerised vinyl chloride units for every 1.0 part by dry weight of ethylene/vinyl acetate copolymer.

It is essential to use a water soluble polymerisation initiator for the polymerisation of the vinyl chloride in order that the formation of suspension polymerised poly vinyl chloride beads is avoided.

Suitable water soluble polymerisation initiators for use in the process of the present invention are ammonium persulphate, potassium persulphate, other water soluble peroxides such as hydrogen peroxide. These may be used in conjunction with reducing agents such as sodium metabisulphite, sodium dithionite etc. Also present may be complexed heavy metals such as the complex of ferrous iron with ethylene diamine tetra-acetic acid etc.

The process of the present invention is suitably carried out by charging the vinyl acetate/ethylene copolymer to a stirred polymerisation vessel together with conventional emulsion polymerisation additives such as surface active agents and protective colloids. Water is added to the system suitably in an amount to give the desired solids content at the theoretical maximum conversion. The reactor is then purged with an inert gas, e.g. nitrogen, and heated with stirring to a conventional emulsion polymerisation temperature for vinyl chloride. The vinyl chloride may be added as a single charge, or preferably it is fed to the reactor continuously during the polymerisation. The rate of the polymerisation is suitably controlled by feeding the polymerisation initiator to the reactor during the course of the reaction. The polymerisation is suitably carried out at the pressures used for the homopolymerisation of vinyl chloride in emulsion polymerisation, i.e. at sufficient pressure to keep the vinyl chloride in the liquid phase at the polymerisation temperature which can suitably be in the range 20° to 80°C.

The following examples illustrate processes for the preparation of film forming latices according to the present invention. The minimum film forming temperature of the latices were determined by the following procedure in each case.

A film of latex 3 thou. thick was spread on a metal block which had a temperature gradient from −15° to +35°C along its length. The latex was allowed to dry under a slow stream of dry nitrogen. At a particular point on the block the film became discontinuous. The temperature at this point was the minimum film-forming temperature.

From studies of the latices prepared by the process of the present invention and illustrated by the examples, it is believed that the vinyl chloride is largely grafted onto the vinyl acetate/ethylene copolymer backbone as intended. A small residual quantity of vinyl chloride is believed to be present as a polyvinyl chloride homopolymer latex, which does not have a significant effect on the performance of the latex.

EXAMPLE 1.

A latex was prepared by the following procedure. All parts in the example are parts by weight.

| Monomer | |
|---|---|
| Vinyl chloride | 100 pts. |
| Aqueous Phase | |
| Ethylene/vinyl acetate copolymer containing 27% copolymerised ethylene in latex of 48.2% solids. | 400 pts. |
| Nonyl phenol/ethylene oxide condensate (30 mole ethylene oxide) | 3.66 pts. |
| Sodium dodecyl benzene sulphonate | 0.87 pts. |
| Polyvinyl alcohol (88% hydrolysed, medium viscosity) | 0.31 pts. |
| Distilled water to give 45 solids at theoretical maximum yield. | |
| Initiators | |
| Ammonium Persulphate | 0.97 pts. |
| Sodium metabisulphite | 2.83 in 83 parts distilled water. |

The aqueous phase was charged into a stirred stainless steel reactor together with the ammonium persulphate. The reactor was purged three times with nitrogen and heated with stirring to 60°C. The vinyl chloride was then charged rapidly. Polymerisation was carried out by pumping in the sodium metabisulphite solution at 5.3 parts per hour until a constant conversion, as measured by the total solid content, was attained.

The experiment was repeated two times using ethylene/vinyl acetate latex charges of 300 and 253 parts of 48.2% solids latex.

The characteristics of the six latices are set out below in Table 1.

Table 1

| Ethylene/ Vinyl acetate | Vinyl chloride charged | Calculated vinyl chloride content of the final polymer | Minimum Film Forming Temp. |
|---|---|---|---|
| 400 parts | 100 parts | 17.1 wt. % | 1 – 2 °C |
| 300 parts | 100 parts | 9.7 wt % | 0 °C |
| 233 parts | 100 parts | 21.6 wt % | 5 – 6 °C |

From the results it can be seen that with an ethylene/vinyl acetate copolymer containing 27 wt % copolymerised ethylene, latices with excellent film forming properties are obtained when the vinyl chloride content of the polymer is from 9.7 to 21.6%.

EXAMPLE 2

The run of the above example was repeated, except the vinyl chloride charge was pumped in continuously during the reaction in the course of 25 hours.

The characteristics of the three latices obtained are set out in Table 2:-

Table 2

| Ethylene/ Vinyl acetate | Vinyl chloride charged | Calculated vinyl chloride content of the final polymer | Minimum Film Forming Temp. |
|---|---|---|---|
| 400 parts | 100 parts | 16.7 wt % | 0 °C |
| 300 parts | 100 parts | 19.0 wt % | 0 – 2 °C |
| 233 parts | 100 parts | 23.4 wt % | 7 – 8 °C |

These results confirm those of Example 1, and demonstrate that polymers containing up to 23.4 wt % vinyl chloride will form films at 8°C or below.

EXAMPLE 3

A latex was prepared by the method described in Example 1 from an ethylene/vinyl acetate copolymer latex containing 27 wt % copolymerised ethylene and with a vinyl chloride to ethylene/vinyl acetate copolymer feed ratio of 35:65 at the beginning of the polymerisation. The resulting latex contained 24.6 wt % of copolymerised vinyl chloride. Investigation by differential thermal analysis showed the copolymer to have glass transition temperature, the latex had a minimum film forming temperature of 9°C.

EXAMPLE 4

A series of ethylene/vinyl acetate copolymers of differing ethylene contents were prepared by emulsion polymerisation, and these were blended to give a second series having ethylene contents (%dry weight) of 15, 19, 25, 31 and 35. The latex blends were then used in the preparation of the series of vinyl chloride graft copolymers shown in Table 3 by the technique disclosed in Example 2. The free vinyl acetate content of the ethylene/vinyl acetate latice was adjusted before each polymerisation by the addition of vinyl acetate monomer in order to minimise the effect of this variable on the composition and properties of the copolymers. The minimum film forming temperatures of the resulting copolymer latices were determined.

Table 3

| Ethylene Content of EVA Copolymer (% dry wt) | Vinyl Chloride Content of Graft Copolymer (% dry wt) | Free Vinyl Acetate added to Graft Polymerisation (wt. % on polymer) | Minimum Film Forming Temperature (°C) |
|---|---|---|---|
| 15 | 18.8 | 4 | 10–11 |
| 19 | 27.2 | 1.3 | 15–16 |
| 19 | 33.2 | 3 | 18–19 |
| 19 | 11.1 | 3 | 1–2 |
| 19 | 11.1 | 1.3 | 4–5 |
| 25 | 21.5 | 2 | 6–7 |
| 25 | 28.7 | 4 | 11–12 |
| 25 | 26.7 | 1.3 | 6–7 |
| 25 | 4.3 | 1.3 | (−4 to −5) |
| 31 | 10.2 | 3 | (−3 to −4) |
| 35 | 22.5 | 2 | (−4 to −5) |

What is claimed is:

1. A copolymer latex capable of form coherent films which comprises a latex of an ethylene/vinyl acetate copolymer with a polymerised ethylene content of 5 to 45% by dry weight having vinyl chloride units graft polymerised therein wherein the copolymer contains 10–35% by weight of graft polymerised vinyl chloride units, said copolymer latex being capable of forming coherent films at 30° C or below.

2. A copolymer as claimed in claim 1 wherein the ethylene/vinyl acetate copolymer has a polymerised ethylene content of 15 to 35% by dry weight.

3. A copolymer as defined in claim 1 wherein the latex is capable of forming coherent films at a temperature of from −5° C to +11° C.

4. A copolymer as claimed in claim 2 wherein the dry weight of vinyl chloride in the copolymer is 9.7 to 21.6%.

5. A copolymer as claimed in claim 2 wherein the dry weight of vinyl chloride in the copolymer is 16.7 to 23.4%.

* * * * *